Aug. 25, 1942.    J. BRISCOE    2,293,799
SAFETY VALVE
Filed Nov. 8, 1939
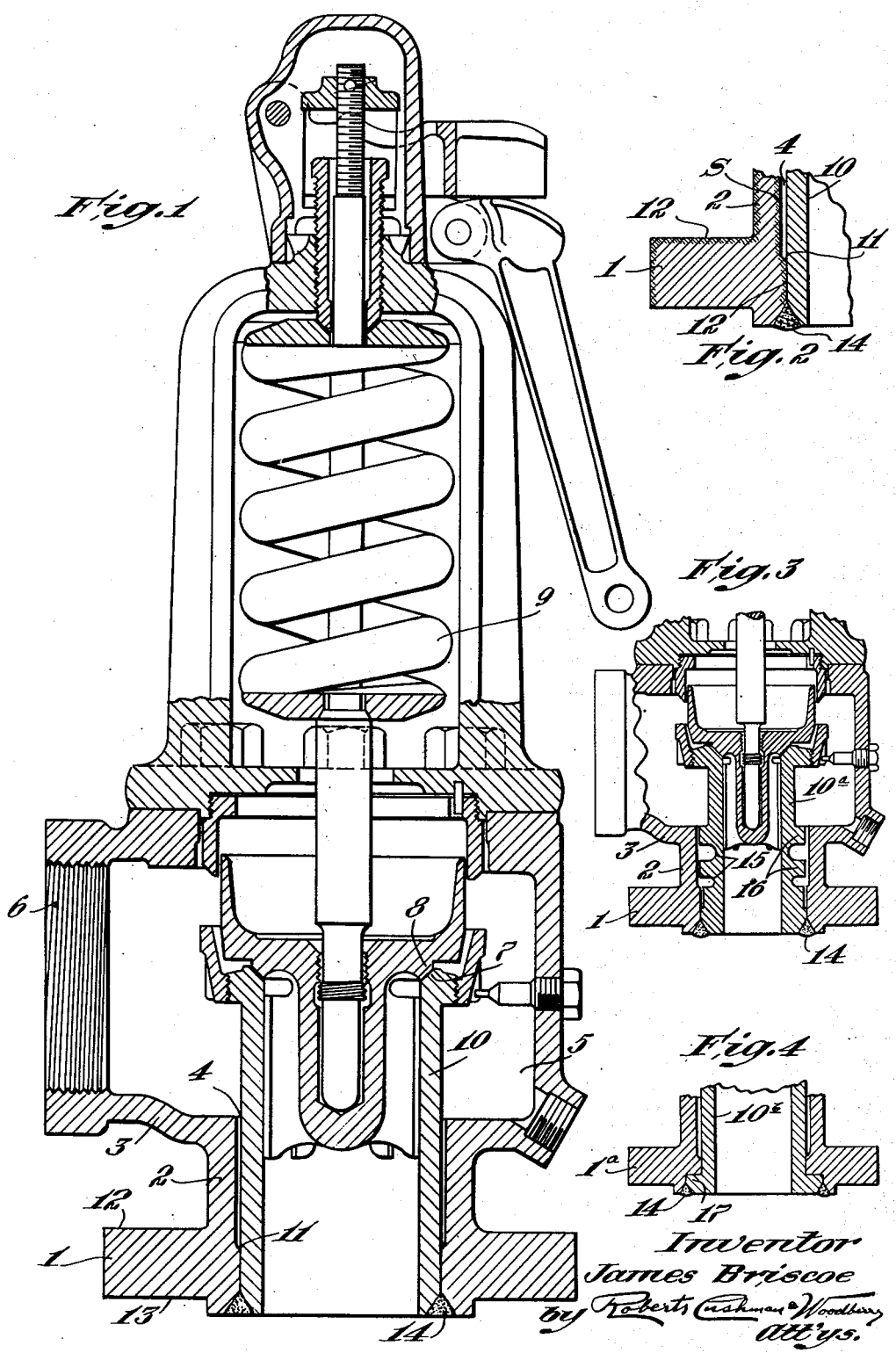
Inventor
James Briscoe
by Roberts Cushman Woodbury
att'ys.

Patented Aug. 25, 1942

2,293,799

UNITED STATES PATENT OFFICE 2,293,799

SAFETY VALVE

James Briscoe, Fairfield, Conn., assignor to Manning, Maxwell & Moore, Incorporated, New York, N. Y., a corporation of New Jersey Application November 8, 1939, Serial No. 303,359

1 Claim. (Cl. 137—53)

This invention pertains to safety valves designed for use on steam boilers, oil stills or other containers for pressure fluid, and relates more particularly to improvements in the support for the valve seat. As pointed out more fully in the patents to Blanchard et al. No. 1,143,027, June 15, 1915, and Graesser et al. No. 1,668,453, May 1, 1928, a great deal of difficulty has heretofore been experienced in so supporting the seat of such a valve as to keep it rigidly and accurately in the proper plane for cooperation with the valve feather. As ordinarily constructed a safety valve comprises a heavy base or attaching flange of large diameter having openings for the reception of studs or bolts by means of which it is secured to the wall or shell of the pressure receptacle. The valve casing usually comprises a relatively slender stem rising from the attaching flange and carrying the body of the casing, within which is a chamber in which the valve feather and seat are located. The trend of development in steam engineering practice, as well as in the petroleum and some chemical industries, is toward the use of increasingly high fluid pressures and temperatures. Thus valve manufacturers are confronted with the necessity of building valves competent to function properly at pressures and temperatures far higher than those which were employed in the past and which continue to increase from year to year, and new problems in construction arise because of the distorting effects of pressures and temperatures such as are now employed. These high pressures require extremely heavy pipes and fittings and the high temperatures exert a very pronounced expansive effect upon these heavy metal parts, and thus the tendency of the valve casing to change its shape during use becomes more and more pronounced.

As noted in the patent to Graesser et al., the valve casing usually comprises relatively thick and thin portions and in the large and heavy valves employed for modern high pressure and high temperature work, the distortion of such an unsymmetrical valve body becomes so pronounced that even such a compensating seat support as disclosed by Blanchard or Graesser may not, of itself, be adequate, even though entirely satisfactory at the more moderate pressures and temperatures of past years. In the Graesser device, the compensating seat support is secured by screw-threaded connections to the valve casing at a point intermediate the upper and lower surfaces of the valve-attaching flange, that is to say, at a point where the material of the casing is not substantially distorted during use. The Graesser arrangement is thus superior to that of Blanchard in respect to compensating distortions arising from higher pressures and temperatures than those in use at the date of the Blanchard patent. However, the Graesser seat support is secured in place by screw threads and the formation of these screw threads makes it necessary to machine away the initially hard surface of the material which defines the wall of the inlet bore. This operation of machining the material of the casing adds a substantial cost item in the manufacture of the casing, but of more importance substantially reduces the strength of the casing at this point by removing the very hard skin surface which is the consequence of the casting or forging operation. This hard surface material is very stiff and adds substantially to the rigidity of the neck of the casing. At the very high pressures and under the great range of temperatures to which the valve may be subjected, a screw-threaded joint, however carefully it may be made or however carefully the abutting surfaces may be packed, can not be depended upon under all conditions absolutely to prevent leakage. At such temperatures and pressures even slight leakage means a substantial loss of heat energy. More important, leaks under such conditions tend rapidly to increase due to the erosive effect of the high temperature pressure fluid.

The principal object of the present invention is to provide a valve having its seat so supported that its plane is substantially unchanged regardless of variations in temperature or pressure, no matter how high, to which the valve may be subjected in use. A further object is to provide seat-supporting means so designed as completely to prevent leakage between the support and the casing or between the support and the seat. A further object is to provide a seat support having the above desired characteristics and which is so mounted in the casing that the initial strength of the casting or forging need not be substantially impaired. Other and further objects and advantages of the invention will be pointed out in the following more detailed description and by reference to the accompanying drawing in which Fig. 1 is a vertical section illustrating a safety valve of conventional type embodying the present invention;

Fig. 2 is a fragmentary section on the same plane as Fig. 1, diagrammatically illustrating certain further details of construction;

Fig. 3 is a fragmentary view illustrating a valve generally similar to Fig. 1 but showing a modification; and Fig. 4 is a fragmentary section showing the lower part of a valve similar to that of Fig. 1, but indicating a further modification.

Referring to the drawing, the numeral 1 designates the attaching flange by means of which the valve is secured (for example by means of bolts) to the shell or wall of the boiler or other pressure fluid container. This attaching flange is usually heavy, of considerable vertical thickness and substantially symmetrical in the horizontal plane so that it does not become distorted to any appreciable extent by reason of any mechanical or temperature stresses to which the valve casing may be subjected. The valve casing also comprises the neck portion 2, integral with the flange 1 and substantially symmetrical with respect to the flange, such neck being of an external diameter substantially smaller than the diameter of the flange. This neck merges at its upper end with the body 3 of the casing, which is integrally joined to the neck and is of larger horizontal dimensions than the neck. This body 3 is hollow and contains the valve chamber 5 into which leads a vertical inlet bore 4 and which has an outlet at the point 6. Within the valve chamber is located the valve seat 7 with which cooperates the valve feather or head 8, which is normally urged toward the seat by means of the spring 9. Since the specific construction and arrangement of the valve feather and its spring forms no essential part of the present invention, further description thereof is unnecessary.

In accordance with the present invention, the valve seat 7 is carried by a seat support 10 which, as illustrated in Fig. 1, is an elongate sleeve or bushing having a smooth axial passage and having the valve seat integrally formed at the upper end of the sleeve. The seat-supporting bushing or sleeve 10 extends downwardly through the bore 4 and has its lower end substantially flush with the lower surface of the casing.

As illustrated particularly in Fig. 2, the bore 4 of the casing is of a diameter from a point 11 to the lower surface 13 of the flange, such that the lower end of the sleeve 10 fits snugly within the bore. Above the point 11 (which lies below the upper surface 12 of the flange 1) the bore 4 is of a diameter exceeding the external diameter of the bushing or sleeve 10 so that nowhere above the point 11 does the bushing contact the casing. In accordance with a preferred construction, the casing is so cast or forged that the bore 4 is of the proper dimensions without necessitating any machining operation, thus leaving the hard skin surface S of the casing which results from the casting or forging operation, substantially intact. Such a mode of procedure leaves the casing with all of the original stiffness and rigidity resulting from the presence of the very hard, compact, dense and rigid skin surface. Thus the casing, and in particular the neck portion 2 thereof, is enabled to resist distorting stresses better than though it were necessary to machine away the skin surface for the accommodation of the sleeve or bushing 10. Leaving the skin surface on the casing has the further advantage that the casting does not tend gradually to change its shape during use, as sometimes results from the removal of the skin surface and the consequent relief of internal stresses.

In assembling the parts, the sleeve or bushing 10 is slipped into the lower smaller diametered portion of the bore 4 and its lower end is molecularly united to the material of the flange 1, for example by welding. The welding operation is so performed as to provide an uninterrupted annular body 14 of fused and solidified metal extending around the entire periphery of the sleeve or bushing 10. This annular body of fused and solidified metal has an intimate and in fact molecular union with the material of the sleeve 10 and the flange 1, respectively, and is reliably effective in preventing the leakage of pressure fluid between the casing and the sleeve 10. In thus uniting the sleeve 10 with the casing, the parts may be welded so that the union consists only of an intermingling of the parts 1 and 10, or the union may comprise additional metal, for example such as might be furnished from a welding bar or stick. On the other hand, the union may be such as results from sweating the parts together with an interposed metal of a lower fusing point, for example, silver solder or the like.

Whatever the particular mode selected for molecularly uniting the sleeve and the flange, the result is a permanent leakproof union of the parts capable of withstanding any pressure to which the valve may be subjected.

Since the sleeve only contacts the casing at points within the thickness of the flange 1, and since, as above noted, this flange is heavy and symmetrical in contour and does not distort in response to stresses to which the valve casing is subjected in use, the sleeve 10 is rigidly held in place at all times and its axis is not displaced even though the valve casing may bend or otherwise change its shape in response to the stresses to which it is subjected. Thus the valve seat 7 always remains in the same plane and in proper position to cooperate with the valve feather in providing a tight and leakproof valve.

While a simple plain sleeve, such as the sleeve 10, is ordinarily sufficient (when mounted in the valve casing as illustrated in Fig. 1) to prevent transmission of any distortion of the valve casing to the valve seat, nevertheless it is contemplated that for use in locations where the most extreme conditions of stress are encountered the seat-supporting bushing or sleeve 10 may be replaced by a sleeve 10ª (Fig. 3) having anti-distortion features, such as disclosed in the patents to Graesser and Blanchard above referred to. Thus this sleeve 10ª may be provided with alternating sections 15 and 16 which are relatively weak and yielding and stiff and unyielding, respectively, such alternating weak and strong sections functioning as pointed out in the Graesser and Blanchard patents to resist the transmission of stresses from the point at which the sleeve is secured to the casing to the valve seat.

While the construction of Fig. 3 may be desirable under some circumstances, as above suggested, the simpler and cheaper construction of Fig. 1 is ordinarily to be preferred, it being noted that the sleeve 10 is a simple plain sleeve of uniform diameter except where at its upper end it is somewhat thickened to provide the valve seat and a mounting for the blow-down ring.

While as here illustrated the valve seat surface is formed directly upon the bushing or sleeve 10 rather than upon an independent ring, for the reason that this construction simplifies and cheapens the device, nevertheless it is contemplated that the valve seat proper may be made as a separate and independent part and secured to the sleeve 10 in any desired manner, for example, as illustrated in the patent to Blanchard above referred to.

A further modification is illustrated in Fig. 4 wherein the sleeve or bushing 10ᵇ is provided with a radial shoulder 17 which fits into a corresponding recess in the flange 1ᵃ—the shoulder 17 being welded at 14 to the material of the casing. This arrangement relieves the welded joint 14 of withstanding force tending to slide the sleeve 10 longitudinally with reference to the casing, and may be desirable when the valve is to be used under extreme conditions of pressure, although ordinarily the simple welded joint is sufficient to unite the parts permanently and to provide the desired leakproof union.

While the arrangements herein illustrated by way of example are desirable and satisfactory, it is to be understood that the invention is not necessarily limited to the precise embodiments herein disclosed but is to be regarded as inclusive of any and all further modifications, substitutions and rearrangements of parts such as fall within the scope of the appended claim.

I claim:

A safety valve for use with fluids at high pressures and temperatures, said valve having a casing which includes a rigid, substantially cylindrical tubular neck portion integrally joined at its lower end to a vertically thick and rigid radial attaching flange by means of which the casing may be secured to a pressure fluid container, the casing also including a hollow body portion having therein a valve chamber, said body portion being integrally joined to the upper end of the neck portion and provided with a lateral delivery passage, the neck portion being of lesser external diameter than the body portion or flange, the casing having an inlet bore coaxial with the flange and leading from the lower surface of the flange up through the neck portion into the valve chamber, a valve seat located within the valve chamber at a point substantially below the plane of the top of the body portion of the casing, and supporting means for the valve seat consisting of an elongate, rigid, substantially cylindrical bushing formed separately from the casing and having the valve seat integral with its upper end, a substantial length of the lower portion of the cylindrical bushing fitting snugly within and directly contacting the wall of the inlet bore, whereby the bushing is maintained under all conditions in axial alignment with the flange, such contact between the outer peripheral surface of the bushing and the wall of the bore being confined to that portion of said wall which is located below the plane of the upper surface of the flange, the remainder of the outer peripheral surface of the bushing being spaced from the wall of the inlet bore, whereby the position of the axis of the bushing is unaffected by distortions of the neck and body portions of the casing, the lower end of the bushing being substantially flush with the lower surface of the casing and being welded directly to the material of the casing, thereby to provide a leak-tight joint between them.

JAMES BRISCOE.